United States Patent
Tso et al.

(10) Patent No.: US 12,061,337 B2
(45) Date of Patent: Aug. 13, 2024

(54) HEAD-UP DISPLAY SYSTEM PROVIDED WITH TRANSPARENT NANO FILM

(71) Applicant: FUYAO GLASS INDUSTRY GROUP CO., LTD., Fujian (CN)

(72) Inventors: Fai Tso, Fujian (CN); Lishan He, Fujian (CN); Fengzhu Huang, Fujian (CN); Rui Zhu, Fujian (CN); Guoshui Lu, Fujian (CN); Kohta Fukuhara, Fujian (CN)

(73) Assignee: FUYAO GLASS INDUSTRY GROUP CO., LTD., Fujian (CN)

( * ) Notice: Subject to any disclaimer, the term of this patent is extended or adjusted under 35 U.S.C. 154(b) by 0 days.

(21) Appl. No.: 18/320,388

(22) Filed: May 19, 2023

(65) Prior Publication Data

US 2023/0288700 A1    Sep. 14, 2023

Related U.S. Application Data

(63) Continuation of application No. PCT/CN2022/086752, filed on Apr. 14, 2022.

(30) Foreign Application Priority Data

Apr. 14, 2021    (CN) .......................... 202110397936.2

(51) Int. Cl.
*B60K 35/23*    (2024.01)
*B32B 7/12*    (2006.01)
(Continued)

(52) U.S. Cl.
CPC ............ *G02B 27/0101* (2013.01); *B32B 7/12* (2013.01); *B32B 15/09* (2013.01);
(Continued)

(58) Field of Classification Search
CPC ................ G02B 27/0101; G02B 27/18; G02B 27/0018; G02B 27/28; G02B 2027/0107;
(Continued)

(56) References Cited

U.S. PATENT DOCUMENTS

2002/0122160 A1\* 9/2002 Kunzman ............ H04N 9/3114
353/31
2009/0303604 A1 12/2009 Martin
(Continued)

FOREIGN PATENT DOCUMENTS

CN    104267499 A    1/2015
CN    106019424 A \* 10/2016 ............. G02B 27/01
(Continued)

OTHER PUBLICATIONS

First office Action dated Dec. 1, 2021 received in Chinese patent Application No. 202110397936.2.
(Continued)

*Primary Examiner* — Adam J Snyder
(74) *Attorney, Agent, or Firm* — Scully, Scott, Murphy & Presser, P.C.

(57) ABSTRACT

This disclosure relates to the field of head-up display (HUD) technology, and more particularly to an HUD system with a transparent nano film for image display. Specifically, an HUD system including ultra-thin glass is provided in the disclosure. The HUD system includes a projection light source, and laminated glass, and a transparent nano film. The transparent nano film includes at least two metal layers. The projection light source is configured to generate P-polarized light. The laminated glass provided with the transparent nano film has a maximum reflectivity Rmax and a minimum reflectivity Rmin for the P-polarized light that has the incident angle ranging from 45° to 72°, where Rmax/Rmin ranges from 1.0 to 2.0.

20 Claims, 5 Drawing Sheets

(51) Int. Cl.
   B32B 15/09    (2006.01)
   B32B 17/10    (2006.01)
   B60K 35/00    (2006.01)
   G02B 27/01    (2006.01)
   G02B 27/18    (2006.01)
   G02B 27/00        (2006.01)
   G02B 27/28        (2006.01)

(52) U.S. Cl.
   CPC ........ B32B 17/10064 (2013.01); B60K 35/00 (2013.01); G02B 27/18 (2013.01); *B32B 2250/05* (2013.01); *B32B 2307/412* (2013.01); *B60K 35/23* (2024.01); *G02B 27/0018* (2013.01); *G02B 2027/0107* (2013.01); *G02B 2027/011* (2013.01); *G02B 2027/0194* (2013.01); *G02B 27/28* (2013.01)

(58) Field of Classification Search
   CPC ...... G02B 2027/011; G02B 2027/0194; B32B 7/12; B32B 15/09; B32B 17/10064; B32B 2250/05; B32B 2307/412; B60K 35/00; B60K 2370/1529
   See application file for complete search history.

(56) References Cited

U.S. PATENT DOCUMENTS

| | | | | |
|---|---|---|---|---|
| 2017/0017079 | A1* | 1/2017 | Zhao | G02B 27/0101 |
| 2017/0242247 | A1* | 8/2017 | Tso | G02B 27/0101 |
| 2018/0149865 | A1* | 5/2018 | Arndt | G02B 27/0101 |
| 2020/0326539 | A1* | 10/2020 | Ando | G02B 5/26 |
| 2020/0371355 | A1* | 11/2020 | Wagner | G02B 27/0101 |

FOREIGN PATENT DOCUMENTS

| | | | | |
|---|---|---|---|---|
| CN | 106082712 A | * | 11/2016 | ............. B32B 17/06 |
| CN | 106094072 A | * | 11/2016 | ....... B32B 17/10036 |
| CN | 106094072 A | | 11/2016 | |
| CN | 205899060 U | | 1/2017 | |
| CN | 106646874 A | * | 5/2017 | ............. G02B 27/01 |
| CN | 107024771 A | | 8/2017 | |
| CN | 107045203 A | | 8/2017 | |
| CN | 107209389 A | | 9/2017 | |
| CN | 207148424 U | | 3/2018 | |
| CN | 110520782 A | * | 11/2019 | ....... B32B 17/10036 |
| CN | 110520782 A | | 11/2019 | |
| CN | 111918852 A | | 11/2020 | |
| CN | 112513716 A | | 3/2021 | |
| CN | 113238377 A | | 8/2021 | |
| DE | 202020107202 U1 | | 1/2021 | |
| JP | 2010230771 A | | 10/2010 | |
| JP | 2017538141 A | | 12/2017 | |
| JP | 2018518713 A | | 7/2018 | |
| JP | 2018173437 A | | 11/2018 | |
| JP | 2018189969 A | | 11/2018 | |
| JP | 2019066773 A | | 4/2019 | |
| JP | 2019525236 A | | 9/2019 | |
| JP | 2021507868 A | | 2/2021 | |
| WO | 2016056617 A1 | | 4/2016 | |
| WO | 2016181740 A1 | | 11/2016 | |
| WO | 2018084076 A1 | | 5/2018 | |
| WO | 2020094422 A1 | | 5/2020 | |

OTHER PUBLICATIONS

International Search Report dated Jul. 6, 2022 received in International Application No. PCT/CN2022/086752.
Notice of Reasons for Refusal dated Mar. 22, 2024 received in Japanese Patent Application No. JP 2023-520346.
Extended European Search Report dated Apr. 8, 2024 received in European Patent Application No. EP 22787589.5.

* cited by examiner

HEAD-UP DISPLAY SYSTEM PROVIDED WITH TRANSPARENT NANO FILM

CROSS-REFERENCE TO RELATED APPLICATION(S)

This application is a continuation of International Application No. PCT/CN2022/086752, filed Apr. 14, 2022, which claims priority to Chinese Patent Application No. 202110397936.2, filed Apr. 14, 2021, the entire disclosures of which are hereby incorporated by reference.

TECHNICAL FIELD

This disclosure relates to the field of head-up display (HUD) technology, and more particularly to an HUD system with a transparent nano film for image display. Specifically, an HUD system including ultra-thin glass is provided in the disclosure.

BACKGROUND

Increasing vehicles are provided with head-up display (HUD) systems, such that important driving information such as speed, engine revolutions, fuel consumption, tire pressure, navigation, and information from an external smart device, can be displayed in real time on a front windshield in a field of view of a driver. As such, the driver does not need to look down to see the driving information, thereby avoiding distraction from a road ahead. Moreover, the driver does not need to adjust the line of sight between a distant road and near instrumentation, which can avoid eye strain, greatly enhance driving safety, and improve driving experience.

The HUD system also has a problem of ghosting along with projected information display, i.e., there may be a secondary image that can be recognized by human eyes in addition to a primary image observed by the human eyes. In order to mitigate or remove the secondary image, a traditional method is to use wedge-shaped laminated glass as a front windshield. For example, use of wedge-shaped polyvinyl butyral (PVB) as an intermediate layer of laminated glass or one glass panel of the laminated glass having a wedge-shaped cross section is disclosed in patents CN105793033B, CN111417518A, and CN110709359A.

P-polarized light and a conductive coating are also used to generate HUD images in the related art such as patent DE102014220189A1 and Chinese patents CN110520782A, CN111433022A, and CN111433023A. As such, functions such as heat insulation and/or electric heating can also be implemented at the same time when an HUD function is implemented, and therefore higher optical and electrical performance of the coating layer are both required. In order to obtain HUD images of a relatively high quality, the number and the thickness of the conductive coating may be increased, which however may cause an excessively large reflectivity RL (8°) for visible light of the laminated glass provided with the conductive coating, and thus it is difficult to ensure that a transmittance for visible light of the laminated glass provided with the conductive coating is greater than or equal to 70%.

SUMMARY

Ahead-up display (HUD) system including ultra-thin glass is provided in the disclosure, so that a problem that laminated glass provided with a conductive coating in the related art is unable to satisfy requirements of high reflectivity for P-polarized light, high transmittance for visible light, and low reflectivity for visible light of a fourth surface can be solved.

In order to solve the above-identified technical problem, the technical scheme of the disclosure includes the following. An HUD system is provided and includes a projection light source, and laminated glass, and a transparent nano film. The laminated glass includes an outer glass panel, an inner glass panel, and an intermediate adhesive layer sandwiched between the outer glass panel and the inner glass panel. The outer glass panel has a first surface and a second surface, the inner glass panel has a third surface and a fourth surface, the transparent nano film is disposed between the second surface and the third surface and includes at least two metal layers. The projection light source is configured to generate P-polarized light incident on the fourth surface, where the P-polarized light has an incident angle ranging from 45° to 72°, and the transparent nano film is capable of reflecting at least part of the P-polarized light incident. A distance between the transparent nano film and the fourth surface is less than or equal to 1.86 mm, the laminated glass provided with the transparent nano film has a reflectivity for the P-polarized light greater than or equal to 6%, and has a maximum reflectivity Rmax and a minimum reflectivity Rmin for the P-polarized light that has the incident angle ranging from 45° to 72°, wherein Rmax/Rmin ranges from 1.0 to 2.0.

An HUD system is further provided in the disclosure and includes a projection light source, and laminated glass, and a transparent nano film. The laminated glass includes an outer glass panel, an inner glass panel, and an intermediate adhesive layer sandwiched between the outer glass panel and the inner glass panel. The outer glass panel has a first surface and a second surface, the inner glass panel has a third surface and a fourth surface, the transparent nano film is disposed between the second surface and the third surface and includes at least two metal layers. The projection light source is configured to generate P-polarized light incident on the fourth surface, where the P-polarized light has an incident angle ranging from 45° to 72°, and the transparent nano film is capable of reflecting at least part of the P-polarized light incident. A distance between the transparent nano film and the fourth surface is less than or equal to 1.86 mm, the laminated glass provided with the transparent nano film has a reflectivity for the P-polarized light greater than or equal to 6%, and at least one of the outer glass panel or the inner glass panel has a refractive index ranging from 1.35 to 1.49.

Preferably, the intermediate adhesive layer has a cross-section in a wedge-shape and having a wedge angle ranging from 0.01 mrad to 0.18 mrad.

Preferably, a proportion of the P-polarized light in polarized light generated by the projection light source is 100%.

Preferably, at least one metal layer has a thickness ranging from 4 nm to 8 nm.

Preferably, the transparent nano film includes at least three metal layers, and a total thickness of the at least three metal layers is greater than 30 nm.

Preferably, at least one metal layer has a thickness greater than or equal to 12 nm.

Preferably, the transparent nano film is deposited on at least one surface of a thermoplastic polyester layer, and where the thermoplastic polyester layer is disposed between the outer glass panel and the inner glass panel, and made from polyethylene terephthalate or polyethylene naphthalate.

Preferably, at least one of the outer glass panel or the intermediate adhesive layer is capable of absorbing the P-polarized light, so that the laminated glass provided with the transparent nano film has an absorptivity for the P-polarized light ranging from 8% to 30%.

Preferably, at least one of the outer glass panel or the inner glass panel is made from fluoride glass, silica glass, or borosilicate glass.

Preferably, the fourth surface of the laminated glass provided with the transparent nano film has a reflectivity RL (8°) for the visible light less than or equal to 15%.

Preferably, the outer glass panel is a curved glass plate with a thickness greater than or equal to 1.8 mm, and the inner glass panel is a curved glass plate with a thickness less than or equal to 1.4 mm.

Preferably, the laminated glass provided with the transparent nano film has a reflectivity for the P-polarized light greater than or equal to 10%.

Preferably, the laminated glass provided with the transparent nano film has a reflectivity R1 for near-infrared light with a wavelength ranging from 580 nm to 680 nm and a reflectivity R2 for blue-green light with a wavelength ranging from 450 nm to 550 nm, and wherein R1/R2 ranges from 1.0 to 1.7.

Preferably, a proportion of near-infrared light with a wavelength ranging from 580 nm to 680 nm in the P-polarized light incident on the fourth surface is T1, a proportion of blue-green light with a wavelength ranging from 450 nm to 550 nm in the P-polarized light incident on the fourth surface is T2, and wherein T1/T2 ranges from 0.1 to 0.9.

Preferably, the laminated glass provided with the transparent nano film has a reflectivity R1 for near-infrared light with a wavelength ranging from 580 nm to 680 nm and a reflectivity R2 for blue-green light with a wavelength ranging from 450 nm to 550 nm, and wherein R1/R2 ranges from 1.01 to 1.5. A proportion of near-infrared light with a wavelength ranging from 580 nm to 680 nm in the P-polarized light incident on the fourth surface is T1, a proportion of blue-green light with a wavelength ranging from 450 nm to 550 nm in the P-polarized light incident on the fourth surface is T2, and wherein T1/T2 ranges from 0.4 to 0.8.

Preferably, the HUD system further includes a light-filtering component and/or is provided with a color-filtering processing algorithm, where the light-filtering component is located on a light path of the P-polarized light and has a transmittance for the P-polarized light greater than or equal to 80%. The HUD system further includes a projection control system configured to control the projection light source to generate the P-polarized light and provided with the color-filtering processing algorithm.

The HUD system provided in the disclosure may generate a clear HUD image without visual ghosting, so that the laminated glass provided the transparent nano film can have both an improved transmittance for the visible light and an improved reflectivity for the P-polarized light, the requirements of high reflectivity for the P-polarized light, high transmittance for the visible light, and low reflectivity for the visible light of the fourth surface may be satisfied, and deficiencies of the HUD image such as being reddish and yellowish may be eliminated, thereby rendering the HUD image in neutral color, and enriching the color of the HUD image to achieve full-color display.

DETAILED DESCRIPTION

The disclosure will be elaborated hereinafter with reference to accompanying drawings.

Figure 1:
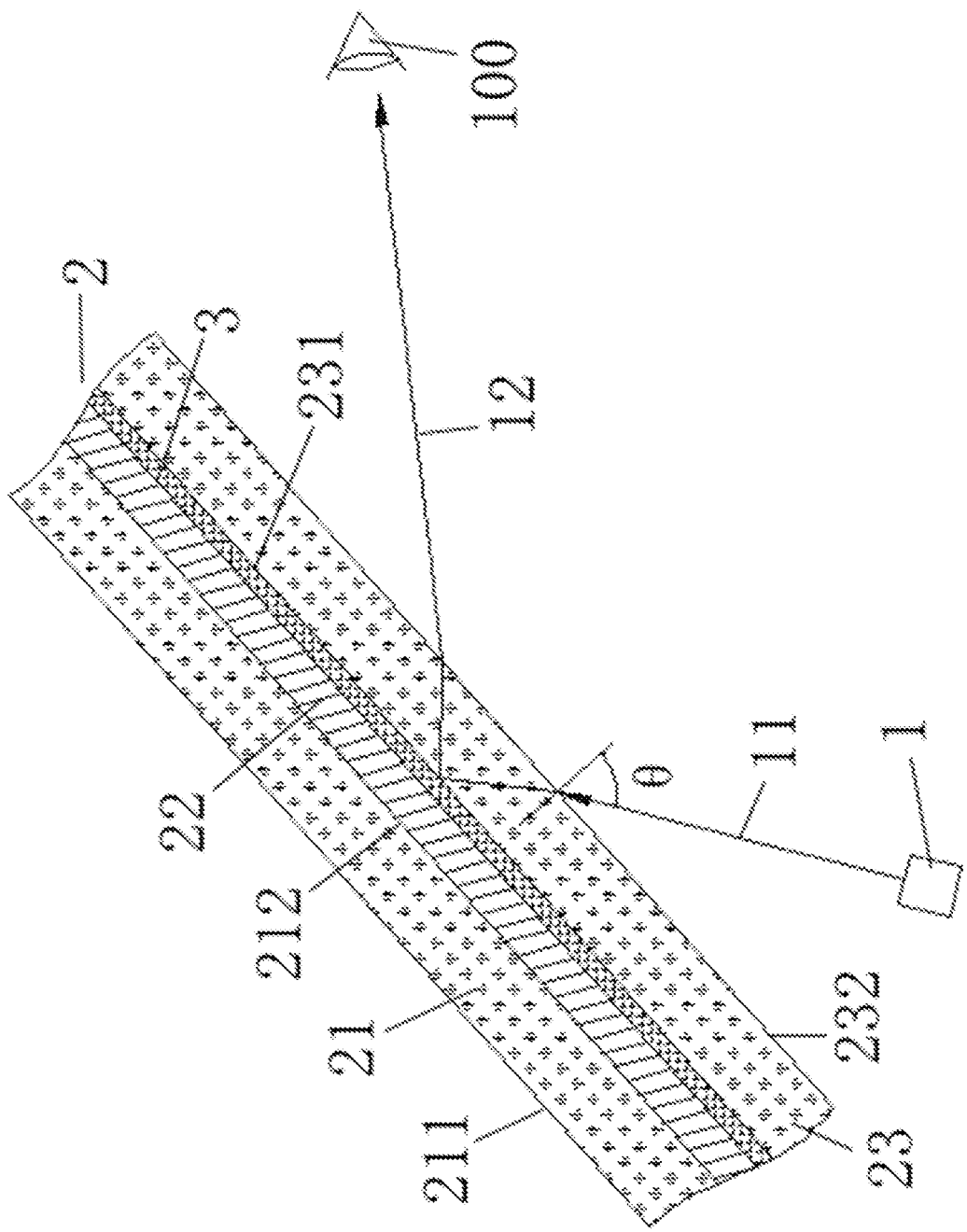
FIG. 1 is a schematic structural view of an HUD system according to the disclosure, where a transparent nano film is disposed on a third surface.
Figure 2:
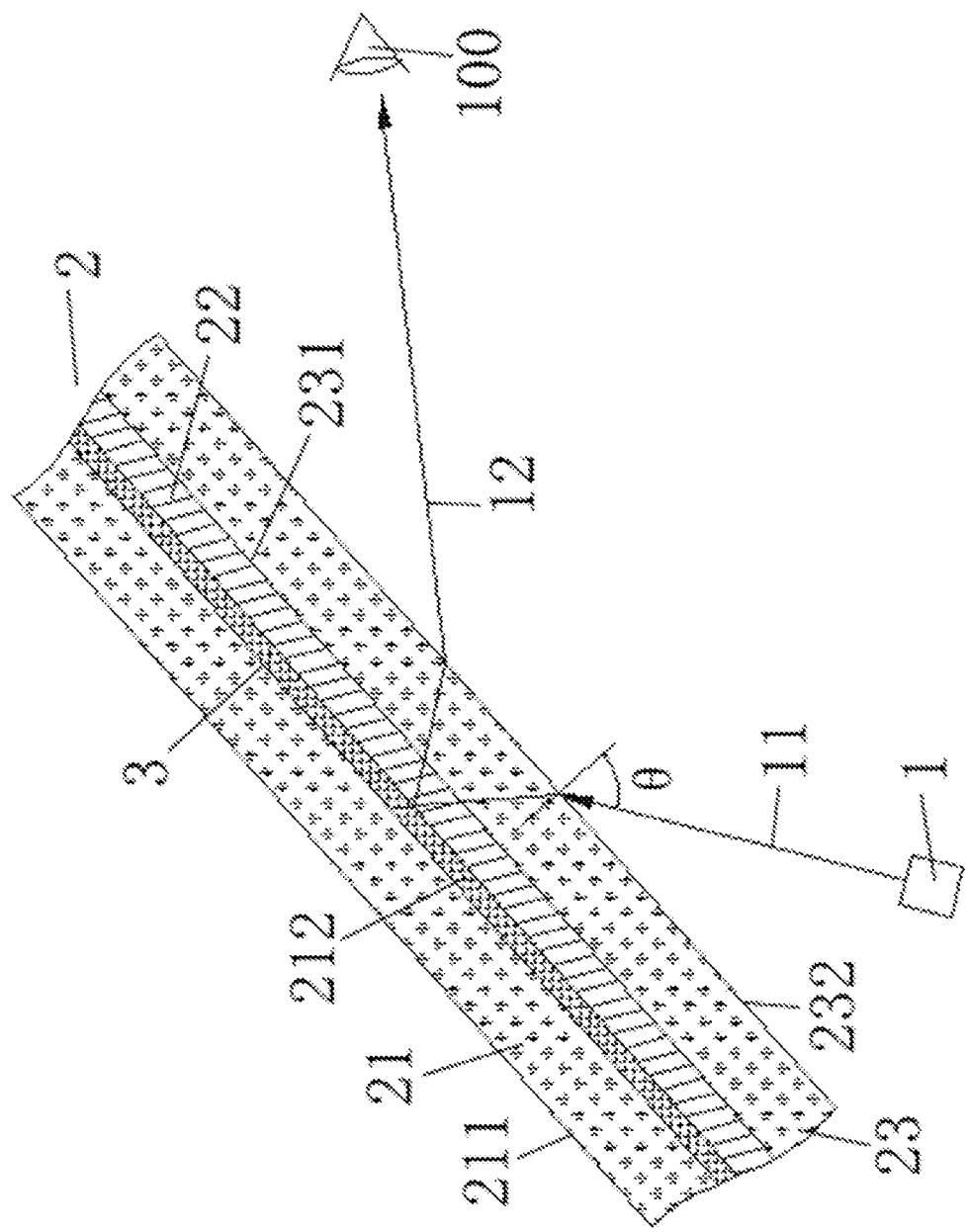
FIG. 2 is a schematic structural view of an HUD system according to the disclosure, where a transparent nano film is disposed on a second surface.

Refer to FIG. 1 and FIG. 2, a head-up display (HUD) system is provided. The HUD system includes a projection light source 1, a laminated glass 2, and a transparent nano film 3. The laminated glass 2 includes an outer glass panel 21, an inner glass panel 23, and an intermediate adhesive layer 22 sandwiched between the outer glass panel 21 and the inner glass panel 23. The outer glass panel 21 has a first surface 211 and a second surface 212. The inner glass panel 23 has a third surface 231 and a fourth surface 232. The transparent nano film 3 is disposed between the second surface 212 and the third surface 231 and includes at least two metal layers. The projection light source 1 is configured to generate P-polarized light 11 incident on the fourth surface 232, where the P-polarized light 11 has an incident angle ranging from 45° to 72°, and the transparent nano film 3 is capable of reflecting at least part of the P-polarized light 11 incident. In the disclosure, when the P-polarized light 11 is incident at the incidence angle ranging from 45° to 72°, a reflectivity for the P-polarized light 11 is relatively low or even zero at a glass-air interface while the transparent nano film 3 has a relatively high reflectivity for the P-polarized light 11, so that only a reflected image from the transparent nano film as a primary image can be observed when reflected images on the laminated glass is viewed, thereby eliminating visual ghosting.

In the disclosure, the first surface 211 is disposed facing an outside of a vehicle and farthest away from the intermediate adhesive layer 22, and the second surface 212 is close to the intermediate adhesive layer 22. The third surface 231 is close to the intermediate adhesive layer 22, and the fourth surface 232 is disposed facing an inside of the vehicle and farthest away from the intermediate adhesive layer 22. The outer glass panel 21 and the inner glass panel 23 are bonded together via the intermediate adhesive layer 22 to form the laminated glass 2.

The intermediate adhesive layer 22 may be made from at least one of polycarbonate (PC), polyvinyl chloride (PVC), polyvinyl butyral (PVB), ethylene vinyl acetate (EVA), polyacrylate (PA), polymethyl methacrylate (PMMA), ionic interlayer (SGP), polyurethane (PU), etc. The intermediate adhesive layer 22 may be a single-layer structure or a multi-layers structure, where the multi-layers structure may exemplarily include a double-layers structure, a three-layers structure, a four-layers structure, and a five-layers structure. The intermediate adhesive layer 22 may also have other functions, e.g., reduction of interference of sunlight to human eyes by setting at least one colored area as a shadow band, sun protection or heat insulation by adding infrared absorbents, ultraviolet (UV) insulation by adding UV absorbents, or sound insulation by adding more plasticizers to one of the intermediate adhesive layer 22 of the multi-layers structure. In order to remove perspective ghosting generated by a scenery in an external environment of the vehicle through a windshield, preferably, the intermediate adhesive layer 22 has a cross-section in a wedge-shape and having a wedge angle ranging from 0.01 milli-radians (mrad) to 0.18 mrad, e.g., 0.01 mrad, 0.02 mrad, 0.03 mrad, 0.04 mrad, 0.05 mrad, 0.06 mrad, 0.07 mrad, 0.08 mrad, 0.09 mrad, 0.10 mrad, 0.11 mrad, 0.12 mrad, 0.13 mrad, 0.14 mrad, 0.15 mrad, 0.16 mrad, 0.17 mrad, or 0.18 mrad. As such, by simply using the intermediate adhesive layer 22 with a relatively small wedge angle, both reflection ghosting and perspective ghosting may be removed at low-cost, thereby obtaining HUD images of a relatively high quality and a relatively good observation effect.

As illustrated in FIG. 1 and FIG. 2, the P-polarized light 11 generated by the projection light source 1 is incident on the fourth surface 232 at an incident angle θ ranging from 45 degrees to 72 degrees. Since the incident angle θ is close to Brewster's angle (about 57°), the P-polarized light incident on the fourth surface 232 is substantially un-reflected on the fourth surface 232. The P-polarized light entering the interior of the laminated glass 2 transmits to the transparent nano film 3. The transparent nano film 3 includes at least two metal layers and may reflect the P-polarized light to form a reflected light 12, and the reflected light 12 may be emitted out through the fourth surface 232 to directly the eyes of an observer 100 to form a primary HUD image. Preferably, a distance between the transparent nano film 3 and the fourth surface 232 is less than or equal to 1.86 mm. A reflectivity of the laminated glass 2 provided with the transparent nano film 3 for the P-polarized light is greater than or equal to 6%, so that an extremely small amount even substantially none of the P-polarized light entered the laminated glass 2 may be further reflected to the eyes of the observer 100, and thus ghosting may hardly be observed by the observer 100. In this case, the HUD image is clear without visual ghosting and thus has a better display effect.

The projection light source 1 is configured to output on the laminated glass 2 relevant texts and image information, such as speed, engine revolutions per minute (rpm), fuel consumption, tire pressure, dynamic navigation, night vision, or live map, which then can be observed by the observer 100 in the vehicle, therefore implementing HUD, and even strengthening augmented reality-HUD (AR-HUD). The projection light source 1 is a component known to those skilled in the art, which includes, but is not limited to, a laser, a light-emitting diode (LED), a liquid crystal display (LCD), digital light processing (DLP), electroluminescent (EL), a cathode ray tube (CRT), a vacuum fluorescent tube (VFD), a collimator lens, a spherical correction mirror, a convex lens, a concave lens, a reflection mirror, and/or a polarizer. In this case, a position and an incidence angle of the projection light source 1 are adjustable to be adapted to different positions or heights of observers 100 in the vehicle. In the disclosure, a proportion of the P-polarized light in polarized light generated by the projection light source 1 is greater than or equal to 70%, more preferably greater than or equal to 90%, or even 100%.

In order to display the HUD image as neutral as possible, meet requirements of a relatively large field of view (FOV), and achieve an uniformity of an overall brightness of the HUD image, in the disclosure, preferably, the laminated glass provided with the transparent nano film has a maximum reflectivity Rmax and a minimum reflectivity Rmin for the P-polarized light incident at the incident angle ranging from 45° to 72°, where Rmax/Rmin ranges from 1.0 to 2.0.

Specifically, for example, Rmax/Rmin may be 1.0, 1.1, 1.2, 1.3, 1.4, 1.5, 1.6, 1.7, 1.8, 1.9, 2.0, etc. If the laminated glass provided with the transparent nano film has the maximum reflectivity Rmax for the P-polarized light 11 incident at 72° (that is, Rp(72°)=14%), and has the minimum reflectivity Rmin for the P-polarized light 11 incident at 60° (that is, Rp(60°)=11%), then Rmax/Rmin=Rp(72°)/Rp(60°)=1.27.

In the disclosure, the transparent nano film 3 includes at least two metal layers. The metal layer may be made of any metal or metal alloy that can reflect P-polarized light, such as silver (Ag), gold (Au), copper (Cu), aluminum (Al), or alloys thereof. In the disclosure, preferably, the metal layer is made of silver or silver alloy, where the silver alloy is preferably an alloy of silver and at least one of gold, aluminum, copper, or platinum. The transparent nano film 3 may further include at least three dielectric layers, and each metal layer is sandwiched between two dielectric layers. According to needs of practical applications, for example, the number of metal layers in the transparent nano film 3 may be two, three, four, five, or even more. For example, the metal layer is made of silver or silver alloy, and the transparent nano film 3 may have double silver-layers, triple silver-layers, four silver-layers, five silver-layers, etc. The dielectric layer may be made of a material selected from oxides of Zn, Mg, Sn, Ti, Nb, Zr, Ni, In, Al, Ce, W, Mo, Sb, or Bi, or made of a material selected from at least one of nitride of Si, Al, Zr, Y, Ce, or La, oxynitride of Si, Al, Zr, Y, Ce, or La, or a mixture of nitride and oxynitride of Si, Al, Zr, Y, Ce, or La. A material and thickness of the metal layer of the transparent nano film 3 may be optimized and designed to withstand subsequent high-temperature heat treatment or other bending forming processes, and the optical performance of the obtained HUD system can meet the use standard of automotive glass, and the shortcomings of poor durability and poor optical appearance of simple metal thin layers are completely overcome.

In the embodiments, at least one metal layer has a thickness ranging from 4 nm to 8 nm, or at least one metal layer has a thickness greater than or equal to 12 nm, so that the laminated glass provided with the transparent nano film can satisfy requirements of high reflectivity for P-polarized light, high transmittance for visible light, and low reflectivity for visible light of the fourth surface. In the embodiments, the transparent nano film includes at least three metal layers, and a total thickness of the at least three metal layers is greater than 30 nm, so that the laminated glass provided with the transparent nano film can satisfy the requirements of high reflectivity for P-polarized light, high transmittance for visible light, and low reflectivity for visible light of the fourth surface.

In the embodiments, the transparent nano film 3 includes an underlying metal layer, an intermediate metal layer, and an outermost metal layer. The underlying metal layer is a first metal layer closest to a deposition substrate of the transparent nano film 3. The outermost metal layer is a third metal layer farthest from the deposition substrate of the transparent nano film 3. The intermediate metal layer is a second metal layer located between the underlying metal layer and the outermost metal layer. A thickness of the outermost metal layer is at least 1.5 times a thickness of the underlying metal layer or a thickness of the intermediate metal layer, so that the laminated glass provided with the transparent nano film can satisfy the requirements of high reflectivity for P-polarized light, high transmittance for visible light, and low reflectivity for visible light of the fourth surface. Preferably, the thickness of the outermost metal layer is greater than the sum of the thickness of the underlying metal layer and the thickness of the intermediate metal layer. More preferably, a difference between the thickness of the underlying metal layer and the thickness of the intermediate metal layer is less than or equal to 2 nm.

As illustrated in FIG. 1, the transparent nano film 3 is deposited on the third surface 231 of the inner glass panel 23. The P-polarized light 11 only passes through the inner glass panel 23. In order to further reduce secondary image effect of the HUD image, preferably, the outer glass panel 21 and/or the intermediate adhesive layer 22 can absorb the P-polarized light, so that the laminated glass 2 provided with the transparent nano film 3 has an absorptivity for the P-polarized light 11 ranging from 8% to 30%, more preferably, ranging from 10% to 20%. As illustrated in FIG. 2, the transparent nano film 3 is deposited on the second surface 212 of the outer glass panel 21 The P-polarized light 11 passes through the intermediate adhesive layer 22 and the inner glass panel 23. In order to obtain HUD images of a relatively high quality, preferably, a difference between a refractive index of the intermediate adhesive layer 22 and a refractive index of the inner glass panel 23 may be less than or equal to 0.1. In order to further reduce the secondary image effect of the HUD image, preferably, the outer glass panel 21 can absorb the P-polarized light, and the laminated glass 2 provided with the transparent nano film 3 has an absorptivity for the P-polarized light 11 ranging from 8% to 30%, more preferably, ranging from 10% to 20%.

Figure 3:
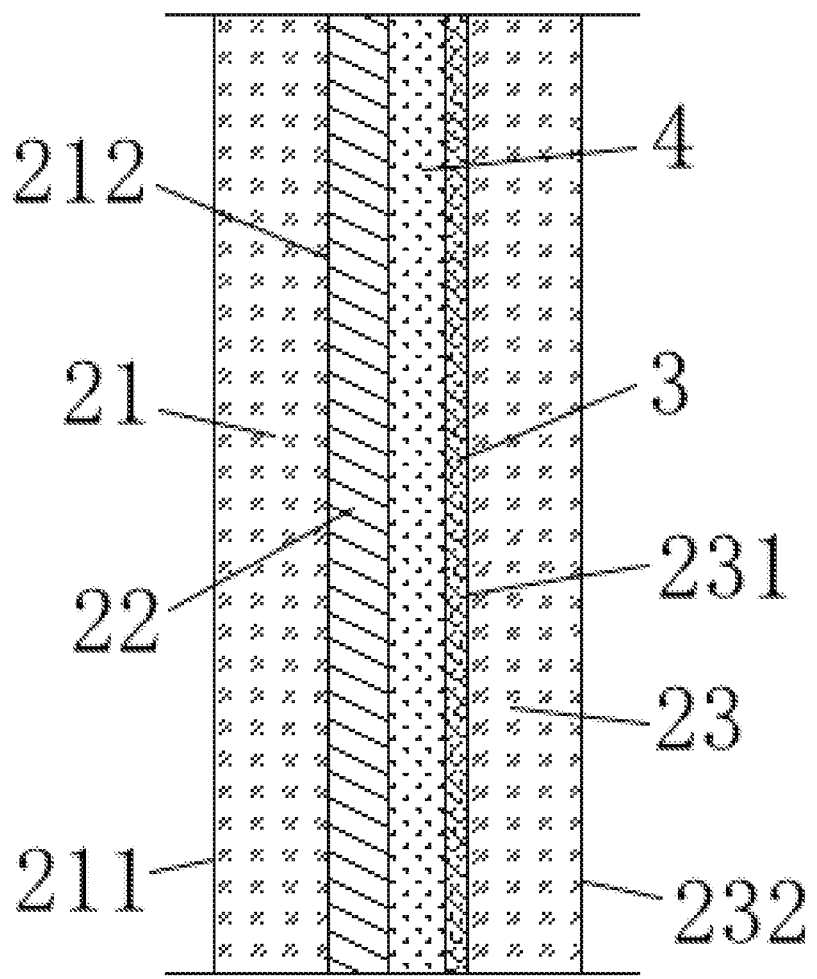
FIG. 3 is a schematic structural view illustrating that a transparent nano film is disposed on a thermoplastic polyester layer according to embodiments of the disclosure.
Figure 4:
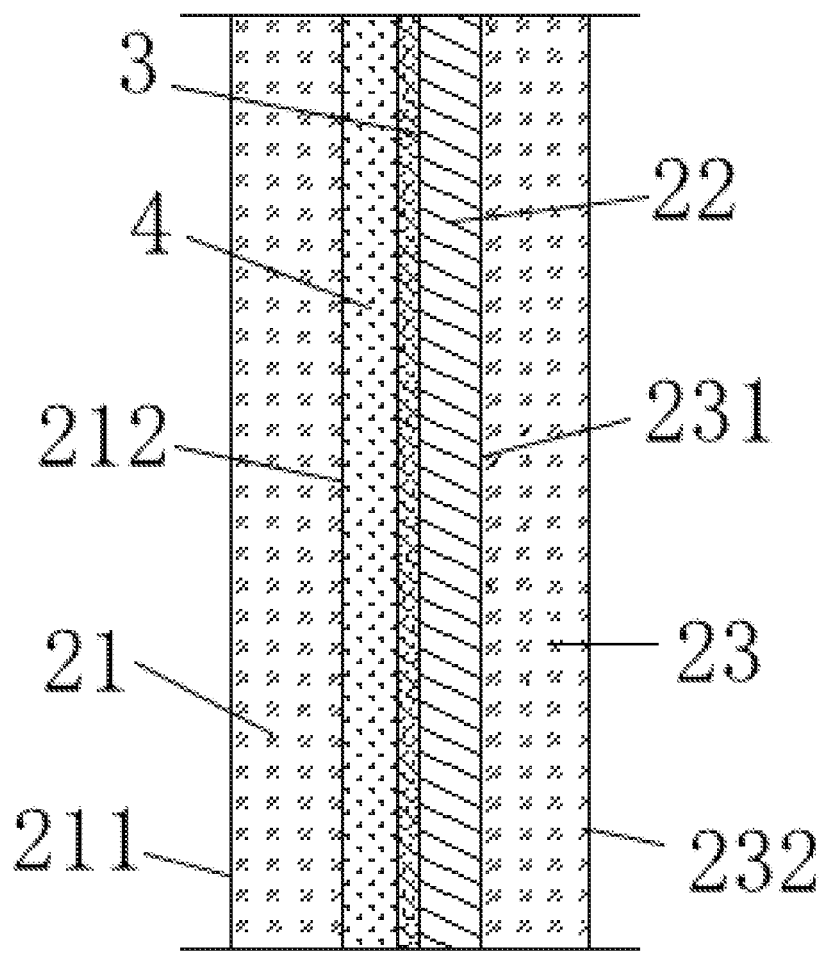
FIG. 4 is a schematic structural view illustrating that a transparent nano film is disposed on a thermoplastic polyester layer according to embodiments of the disclosure.
Figure 5:
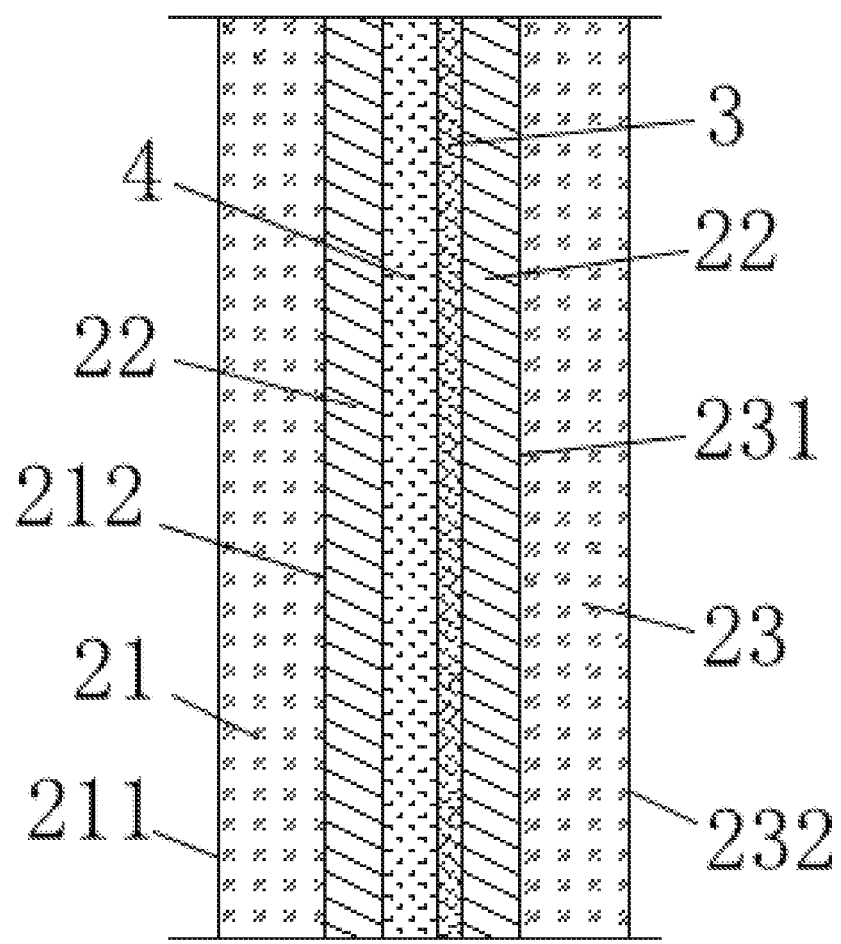
FIG. 5 is a schematic structural view illustrating that a transparent nano film is disposed on a thermoplastic polyester layer according to embodiments of the disclosure.

As illustrated in FIG. 3, FIG. 4, and FIG. 5, the transparent nano film 3 may also be deposited on at least one surface of a thermoplastic polyester layer 4. The thermoplastic polyester layer 4 is disposed between the outer glass panel 21 and the inner glass panel 23. Preferably, the thermoplastic polyester layer 4 is made from polyethylene terephthalate (PET) or polyethylene naphthalate (PEN). Specifically, as illustrated in FIG. 3, the thermoplastic polyester layer 4 on which the transparent nano film 3 is deposited is between the intermediate adhesive layer 22 and the inner glass panel 23, and the transparent nano film 3 is between the thermoplastic polyester layer 4 and the third surface 231. In an embodiment, the thermoplastic polyester layer 4 on which the transparent nano film 3 is deposited is between the intermediate adhesive layer 22 and the inner glass panel 23, and the transparent nano film 3 is between the thermoplastic polyester layer 4 and the intermediate adhesive layer 22. As illustrated in FIG. 4, the thermoplastic polyester layer 4 on which the transparent nano film 3 is deposited is between the outer glass panel 21 and the intermediate adhesive layer 22, and the transparent nano film 3 is between the intermediate adhesive layer 22 and the thermoplastic polyester layer 4. In an embodiment, the thermoplastic polyester layer 4 on which the transparent nano film 3 is deposited is between the outer glass panel 21 and the intermediate adhesive layer 22, and the transparent nano film 3 is between the second surface 212 and the thermoplastic polyester layer 4. As illustrated In FIG. 5, the thermoplastic polyester layer 4 on which the transparent nano film 3 is deposited is between two intermediate adhesive layers 22, and the transparent nano film 3 is between the thermoplastic polyester layer 4 and the third surface 231. In an embodiment, the thermoplastic polyester layer 4 on which the transparent nano film 3 is deposited is between two intermediate adhesive layers 22, and the transparent nano film 3 is between the thermoplastic polyester layer 4 and the second surface 212.

Traditional laminated glass adopts a common soda-lime-silica glass plate. Specifically, a specific structure of the traditional laminated glass may be common soda-lime-silica glass plate/polyvinyl butyral (PVB) plate/common soda-lime-silica glass plate. The common soda-lime-silica glass plate has a refractive index n ranging from 1.51 to 1.52. It is noted that, at least one of the outer glass panel 21 or the inner glass panel 23 is a glass plate with a refractive index n ranging from 1.35 to 1.49, and thus it is possible to improve the reflectivity for P-polarized light of the laminated glass 2 and reduce the reflectivity for visible light of the fourth surface 232 while ensuring the transmittance for visible light of the laminated glass 2 to be greater than or equal to 70%. For example, a specific structure of the laminated glass may be outer glass panel (n=1.52)/PVB/inner glass panel (n=1.47), outer glass panel (n=1.47)/PVB/inner glass panel (n=1.51), outer glass panel (n=1.47)/PVB/inner glass panel (n=1.47), etc., so that the fourth surface 232 of the laminated glass 2 provided with the transparent nano film 3 has a reflectivity RL (8°) for visible light less than or equal to 15%, even less than or equal to 10%, and even less than or equal to 6%, and thus an interior reflection of the vehicle may be reduced, and the requirements of high reflectivity for P-polarized light, high transmittance for visible light, and low reflectivity for visible light of the fourth surface may be satisfied. The glass plate with the refractive index n ranging from 1.35 to 1.49 may be made from fluoride glass, silica glass, or borosilicate glass.

In order to meet use safety requirements of automobile glass, the outer glass panel 21 is a curved glass plate with a thickness greater than or equal to 1.8 mm. In order to achieve HUD images of a relatively high quality and vehicle weight reduction, preferably, the inner glass panel 23 is a curved glass plate with a thickness less than or equal to 1.4 mm, and more preferably, the inner glass panel 23 has a thickness ranging from 0.3 mm to 1.2 mm. The curved glass plate may be processed through physical strengthening, chemical strengthening, or main-body strengthening. The physical strengthening in the disclosure mainly refers to that the glass plate is subjected to high temperature heat treatment at a temperature of at least 560° C. and bending forming. The chemical strengthening in the disclosure mainly refers to that ion exchange of ions of different ionic radii is carried out on a glass surface so that a relatively high surface stress is generated on the glass surface accompanied by a certain stress layer depth, and thus a glass strength in terms of mechanical properties is improved. The main-body strengthening in the disclosure refers to that neither physical strengthening nor chemical strengthening is needed, the original glass itself may be directly combined with another glass to form laminated glass, and the quality of the laminated glass meets use standards of automotive laminated glass, such as GB standard of automotive safety glass GB9656-2016.

Preferably, the laminated glass 2 provided with the transparent nano film 3 has a reflectivity for the P-polarized light 11 greater than or equal to 10%, more preferably, greater than or equal to 15%, so that a relatively high brightness ratio of the primary image to the secondary image can be obtained. The reflectivity of the laminated glass 2 provided with the transparent nano film 3 for the P-polarized light 11 may be measured and calculated according to standard ISO9050. Generally, the P-polarized light 11 has a wavelength ranging from 380 nm to 780 nm. The laminated glass 2 provided with the transparent nano film 3 has a reflectivity R1 for near-infrared light with a wavelength ranging from 580 nm to 680 nm and a reflectivity R2 for blue-green light with a wavelength ranging from 450 nm to 550 nm, and preferably, R1/R2 ranges from 1.0 to 1.7 to eliminate deficiencies of the HUD image such as being reddish and yellowish. Specifically, for example, R1/R2 may be 1.0, 1.1, 1.2, 1.3, 1.4, 1.5, 1.6, 1.7, etc. More preferably, R1/R2 ranges from 1.01 to 1.5, so that a relatively high reflectivity for the P-polarized light can be achieved to obtain an improved quality HUD image.

For eliminating deficiencies of the HUD image such as being reddish or yellowish, rendering the HUD image in neutral color, and enriching colors of the HUD image to achieve full-color display, for example, to display marks or symbols in different colors such as red, green, blue, yellow, orange, or white in the HUD image at the same time, in the disclosure, preferably, a proportion of near-infrared light with a wavelength ranging from 580 nm to 680 nm in the P-polarized light 11 incident on the fourth surface 232 is T1, a proportion of blue-green light with a wavelength ranging from 450 nm to 550 nm in the P-polarized light 11 incident on the fourth surface 232 is T2, and T1/T2 ranges from 0.1 to 0.9. Specifically, for example, T1/T2 may be 0.1, 0.2, 0.3, 0.4, 0.5, 0.6, 0.7, 0.8, or 0.9. More preferably, T1/T2 ranges from 0.4 to 0.8. According to a chromaticity theory, tri-stimulus values X, Y, Z of a color of any object R ($\lambda$) under a given illumination source S ($\lambda$) satisfy the following expressions:

$$X = k \int_{380}^{780} S(\lambda) * R(\lambda) * \overline{X}(\lambda) * d\lambda$$

$$Y = k \int_{380}^{780} S(\lambda) * R(\lambda) * \overline{Y}(\lambda) * d\lambda$$

$$Z = k \int_{380}^{780} S(\lambda) * R(\lambda) * \overline{Z}(\lambda) * d\lambda$$

where k represents an adjustment factor, R ($\lambda$) represents a spectral reflectivity of an object, S ($\lambda$) represents relative spectral power distribution of a light source, $\overline{X}(\lambda)$, $\overline{Y}(\lambda)$, $\overline{Z}(\lambda)$ represent spectral tri-stimulus values calculated from the international commission on illumination (CIE) standard observer, and d$\lambda$, represents a wavelength interval. As can be known from the above expressions, in the disclosure, the relative spectral power distribution of the P-polarized light 11 incident on the fourth surface 232 is improved based on a ratio of the reflectivity R1 for near-infrared light to the reflectivity R2 for blue-green light of the laminated glass 2 with the transparent nano film 3. Moreover, in the disclosure, full-color display can be achieved without strict control of a ratio of synthetic light of the projection light source, so that the full-color display can be achieved at a low cost and a selection cost of the projection light source is lowered.

For improving the relative spectral power distribution of the P-polarized light 11 incident on the fourth surface 232, in the disclosure, preferably, the HUD system further includes a light-filtering component and/or is provided with a color-filtering processing algorithm, so that T1/T2 ranges from 0.1 to 0.9. The light-filtering component is located on an optical path of the P-polarized light, and the light-filtering component has a transmittance for the P-polarized light greater than or equal to 80%. For example, the light-filtering component may be a filter, a filter film, a film, a filter lens, or a micro-nano array. The light-filtering component may be located inside the projection light source 1 or between the projection light source 1 and the laminated glass 2. The HUD system further includes a projection control system, the projection control system is configured to control the projection light source 1 to generate the P-polarized light 11, and the projection control system is provided with the color-filtering processing algorithm. The P-polarized light 11 generated by the projection light source 1 is processed with the color-filtering processing algorithm in digital image processing technology, where the color-filtering processing algorithm may exemplarily be a linear method, a non-linear method, a masking method, a color compensation method, or a color correction method.

EMBODIMENTS

Embodiments of the disclosure will be elaborated hereinafter, but the disclosure is not limited thereto.

HUD systems in embodiments 1 to 15 and HUD systems in comparative embodiments 1 to 3 are provided in the disclosure for illustration. In embodiments 1 to 15 and comparative embodiments 1 to 3, a projection light source is a thin transistor film-liquid crystal display (TFT-LCD) projector with LED backlight, which can generate 100% P-polarized light and further includes multiple reflection mirrors. A position of the projection light source and an incident direction of exited light may be adjusted, so that a most clear display image can be observed by an observer. Clear glass in the embodiments of the disclosure has a transmittance for visible light greater than or equal to 70%.

In the P-polarized light 11 incident on the fourth surface 232, a proportion of near-infrared light with a wavelength ranging from 580 nm to 680 nm in the P-polarized light 11 incident on the fourth surface 232 is T1, a proportion of blue-green light with a wavelength ranging from 450 nm to 550 nm in the P-polarized light 11 incident on the fourth surface 232 is T2, where T1 and T2 are calculated according to the following expressions, respectively:

$$T1 = \frac{k \int_{580}^{680} S(\lambda) * \left( \overline{X}(\lambda) + \overline{Y}(\lambda) + \overline{Z}(\lambda) \right) * d\lambda}{k \int_{380}^{780} S(\lambda) * \left( \overline{X}(\lambda) + \overline{Y}(\lambda) + \overline{Z}(\lambda) \right) * d\lambda}$$

$$T2 = \frac{k \int_{450}^{550} S(\lambda) * \left( \overline{X}(\lambda) + \overline{Y}(\lambda) + \overline{Z}(\lambda) \right) * d\lambda}{k \int_{380}^{780} S(\lambda) * \left( \overline{X}(\lambda) + \overline{Y}(\lambda) + \overline{Z}(\lambda) \right) * d\lambda},$$

where k represents an adjustment factor, S ($\lambda$) represents relative spectral power distribution of a light source, $\overline{X}(\lambda)$, $\overline{Y}(\lambda)$, $\overline{Z}(\lambda)$ represent spectral tri-stimulus values calculated from the CIE standard observer, and d$\lambda$ represents a wavelength interval.

The laminated glass provided with the transparent nano film 3 has a reflectivity R1 for near-infrared light with a wavelength ranging from 580 nm to 680 nm and a reflectivity R2 for blue-green light with a wavelength ranging from 450 nm to 550 nm, where the reflectivity R1 and the reflectivity R2 are measured and calculated according to standard ISO 9050.

Evaluation method for no-ghosting: in a darkroom, whether there is ghosting is determined by visually observing whether there is a secondary image or whether the secondary image is obvious. The HUD image is visually observed at the incident angle, and it is defined that there is no ghosting when there is no secondary image or the secondary image is not obvious; otherwise, there is ghosting.

Reflectivity for P-polarized light: the reflectivity of the laminated glass 2 provided with the transparent nano film 3 for the P polarized light 11 is measured every one degree within an incident angle ranging from 45° to 72°, that is, Rp(45°), Rp(46°), Rp(47°), . . . , Rp(71°), Rp(72°). The maximum reflectivity is Rmax, and the minimum reflectivity is Rmin. For example, there is the maximum reflectivity when the incident angle is 72°, and there is the minimum reflectivity when the incident angle is 60°, that is, Rmax=Rp (72°), and Rmin=Rp(60°). Transmittance (TL) for visible light: a transmittance for visible light with a wavelength ranging from 380 nm to 780 nm is calculated according to standard ISO9050.

Embodiments 1 to 5 and Comparative Embodiment 1

In the disclosure, a film structure of the transparent nano film is designed and the thickness of the inner glass panel is adjusted, the outer glass panel, the inner glass panel, and at least one piece of intermediate adhesive layer are prepared, and embodiments 1 to 5 and comparative embodiment 1 are carried out according to the automobile glass production process.

Embodiment 1

Laminated glass: outer glass panel (2.1 mm clear glass)/PVB (0.76 mm)/transparent nano film/inner glass panel (1.0 mm clear glass).

Transparent nano film: clear glass (1.0 mm)/SiO2 (15 nm)/SiN (41.2 nm)/AZO (10 nm)/Ag (7.0 nm)/NiCr (0.35 nm)/AZO (5 nm)/Ag (5.0 nm)/AZO (10 nm)/SiN (40 nm).

Embodiment 2

Laminated glass: outer glass panel (2.1 mm clear glass)/transparent nano film/PVB (0.76 mm)/inner glass panel (0.7 mm clear glass).

Transparent nano film: clear glass (2.1 mm)/ZnSnOx (24.0 nm)/TiO2 (3.1 nm)/AZO (10 nm)/AgCuPt (5.0 nm)/AZO (10 nm)/TiN (2.0 nm)/TiO2 (8.6 nm)/ZnSnOx (48.7 nm)/AZO (10 nm)/AgCu (5.0 nm)/AZO (10 nm)/ZnSnOx (56.7 nm)/TiO2 (17.4 nm)/AZO (5 nm)/AgCuPt (15.0 nm)/AZO (5 nm)/TiO2 (16.9 nm)/ZnSnOx (23.9 nm)/SiN (5.0 nm).

Embodiment 3

Laminated glass: outer glass panel (2.1 mm clear glass)/PVB (0.76 mm)/transparent nano film/inner glass panel (0.7 mm clear glass).

Transparent nano film: clear glass (2.1 mm)/ZnSnOx (24.0 nm)/TiO2 (3.1 nm)/AZO (10 nm)/AgCuPt (5.0 nm)/AZO (10 nm)/TiN (2.0 nm)/TiO2 (8.6 nm)/ZnSnOx (48.7 nm)/AZO (10 nm)/AgCu (5.0 nm)/AZO (10 nm)/ZnSnOx (56.7 nm)/TiO2 (17.4 nm)/AZO (5 nm)/AgCuPt (15.0 nm)/AZO (5 nm)/TiO2 (16.9 nm)/ZnSnOx (23.9 nm)/SiN (5.0 nm).

Embodiment 4

Laminated glass: outer glass panel (2.1 mm clear glass)/transparent nano film/PVB (0.76 mm)/inner glass panel (0.5 mm clear glass).

Transparent nano film: clear glass (2.1 mm)/ZnSnOx (34.1 nm)/AZO (10 nm)/Ag (5.0 nm)/AZO (10 nm)/SiN (78.1 nm)/AZO (10.0 nm)/Ag (5.7 nm)/AZO (10.0 nm)/ZnSnOx (65.8 nm)/AZO (10.0 nm)/Ag (8.5 nm)/AZO (10.0 nm)/SiN (61.7 nm)/AZO (10.0 nm)/Ag (15.0 nm)/AZO (10.0 nm)/SiN (46 nm).

Embodiment 5

Laminated glass: outer glass panel (2.1 mm clear glass)/PVB (0.76 mm)/PET (0.05 mm)/transparent nano film/PVB (0.38 mm)/inner glass panel (0.5 mm clear glass).

Transparent nano film: PET (0.05 mm)/ZnSnOx (34.1 nm)/AZO (10 nm)/Ag (5.0 nm)/AZO (10 nm)/SiN (78.1 nm)/AZO (10.0 nm)/Ag (5.7 nm)/AZO (10.0 nm)/ZnSnOx (65.8 nm)/AZO (10.0 nm)/Ag (8.5 nm)/AZO (10.0 nm)/SiN (61.7 nm)/AZO (10.0 nm)/Ag (15.0 nm)/AZO (10.0 nm)/SiN (46 nm).

Comparative Embodiment 1

Laminated glass: outer glass panel (2.1 mm clear glass)/PVB (0.76 mm)/inner glass panel (2.1 mm clear glass).
No Transparent Nano Film.

In embodiments 1 to 5 and comparative embodiment 1, the HUD system projects the P-polarized light generated by the projection light source with an incident angle ranging from 45° to 72°. There is no light-filtering component and/or color-filtering processing algorithm provided in the HUD system. Whether the HUD image is clear and has no ghosting is determined by visually observation. At the same time, the reflectivity of the laminated glass provided with the transparent nano film for the P-polarized light is recorded every one degree, so that Rp(60°) and Rmax/Rmin can be obtained, and results are taken in Table 1.

TABLE 1

HUD image quality in embodiments 1 to 5 and comparative embodiment 1

| | Comparative embodiment 1 | Embodiment 1 | Embodiment 2 | Embodiment 3 | Embodiment 4 | Embodiment 5 |
|---|---|---|---|---|---|---|
| Rp(60°) | 0.01% | 12.8% | 13.3% | 13.5% | 13.7% | 13.8% |
| Rmax/Rmin | / | 1.6 | 1.6 | 1.5 | 1.4 | 1.4 |
| HUD image quality | Blurry and ghosting | Clear and no ghosting | Clear and no ghosting | Clear and no ghosting | Clear and no ghosting | Clear and no ghosting |

As can be seen from table 1, no transparent nano film is provided in comparative embodiment 1 and thus the HUD function cannot be realized. The transparent nano film is provided in embodiments 1 to 5, and thus the HUD function can be realized, the HUD image is clear without visual ghosting, and has a good display effect. In embodiments 1 to 5, Rmax/Rmin ranges from 1.4 to 1.6, so that the HUD image can be displayed as neutral as possible, the requirements of a relatively large FOV can be met, and the uniformity of the overall brightness of the HUD image can be achieved.

Embodiments 6 to 10 and Comparative Embodiment 2

In the disclosure, the refractive index n and the thickness of the outer glass panel is adjusted, the refractive index n and the thickness of the inner glass panel is adjusted, the outer glass panel, the inner glass panel, and at least one piece of intermediate adhesive layer are prepared, and embodiments 6 to 10 and comparative embodiment 2 are carried out according to the automobile glass production process.

Embodiment 6

Laminated glass: outer glass panel (2.1 mm clear glass, n=1.52)/transparent nano film/PVB (0.76 mm)/inner glass panel (0.7 mm clear glass, n=1.47).

Transparent nano film: outer glass panel/ZnSnOx (37.3 nm)/AZO (10 nm)/Ag (6.7 nm)/AZO (10 nm)/ZnSnOx (51.3 nm)/AZO (10 nm)/Ag (6.8 nm)/AZO (10 nm)/ZnSnOx (45 nm)/AZO (10 nm)/Ag (14.4 nm)/AZO (10 nm)/ZnSnOx (24 nm)/SiN (5 nm).

Embodiment 7

Laminated glass: outer glass panel (2.1 mm clear glass, n=1.47)/transparent nano film/PVB (0.76 mm)/inner glass panel (0.7 mm clear glass, n=1.47).

Transparent nano film: outer glass panel/ZnSnOx (37.3 nm)/AZO (10 nm)/Ag (6.7 nm)/AZO (10 nm)/ZnSnOx (51.3 nm)/AZO (10 nm)/Ag (6.8 nm)/AZO (10 nm)/ZnSnOx (45 nm)/AZO (10 nm)/Ag (14.4 nm)/AZO (10 nm)/ZnSnOx (24 nm)/SiN (5 nm).

Embodiment 8

Laminated glass: outer glass panel (2.1 mm clear glass, n=1.47)/transparent nano film/PVB (0.76 mm)/inner glass panel (0.7 mm clear glass, n=1.52).

Transparent nano film: outer glass panel/ZnSnOx (37.3 nm)/AZO (10 nm)/Ag (6.7 nm)/AZO (10 nm)/ZnSnOx (51.3 nm)/AZO (10 nm)/Ag (6.8 nm)/AZO (10 nm)/ZnSnOx (45 nm)/AZO (10 nm)/Ag (14.4 nm)/AZO (10 nm)/ZnSnOx (24 nm)/SiN (5 nm).

Embodiment 9

Laminated glass: outer glass panel (2.1 mm clear glass, n=1.52)/transparent nano film/PVB (0.76 mm)/inner glass panel (0.7 mm clear glass, n=1.40).

Transparent nano film: outer glass panel/ZnSnOx (37.3 nm)/AZO (10 nm)/Ag (6.7 nm)/AZO (10 nm)/ZnSnOx (51.3 nm)/AZO (10 nm)/Ag (6.8 nm)/AZO (10 nm)/ZnSnOx (45 nm)/AZO (10 nm)/Ag (14.4 nm)/AZO (10 nm)/ZnSnOx (24 nm)/SiN (5 nm).

Embodiment 10

Laminated glass: outer glass panel (2.1 mm clear glass, n=1.52)/PVB (0.76 mm)/transparent nano film/inner glass panel (0.7 mm clear glass, n=1.47).

Transparent nano film: inner glass panel/ZnSnOx (37.3 nm)/AZO (10 nm)/Ag (8.2 nm)/AZO (10 nm)/ZnSnOx (51.3 nm)/AZO (10 nm)/Ag (8.0 nm)/AZO (10 nm)/ZnSnOx (45 nm)/AZO (10 nm)/Ag (15.5 nm)/AZO (10 nm)/ZnSnOx (24 nm)/SiN (5 nm).

Comparative Embodiment 2

Laminated glass: outer glass panel (2.1 mm clear glass, n=1.52)/transparent nano film/PVB (0.76 mm)/inner glass panel (0.7 mm clear glass, n=1.52).

Transparent nano film: outer glass panel/ZnSnOx (37.3 nm)/AZO (10 nm)/Ag (6.7 nm)/AZO (10 nm)/ZnSnOx (51.3 nm)/AZO (10 nm)/Ag (6.8 nm)/AZO (10 nm)/ZnSnOx (45 nm)/AZO (10 nm)/Ag (14.4 nm)/AZO (10 nm)/ZnSnOx (24 nm)/SiN (5 nm).

In embodiments 6 to 10 and comparative embodiment 2, the HUD system projects the P-polarized light generated by the projection light source with an incident angle ranging from 45° to 72°. There is no light-filtering component and/or color-filtering processing algorithm provided in the HUD system. Whether the HUD image is clear and has no ghosting is determined through visually observation. At the same time, the reflectivity of the laminated glass provided with the transparent nano film for the P-polarized light is recorded every one degree, so that Rp(60°) and Rmax/Rmin can be obtained, the transmittance (TL) for visible light of the laminated glass provided with the transparent nano film is calculated, and results are taken in Table 2.

TABLE 2

HUD image quality in embodiments 6 to 10 and comparative embodiment 2

|  | Comparative embodiment 2 | Embodiment 6 | Embodiment 7 | Embodiment 8 | Embodiment 9 | Embodiment 10 |
|---|---|---|---|---|---|---|
| Rp(60°) | 13.3% | 13.5% | 13.9% | 13.5% | 14.3% | 14.7% |
| Rmax/Rmin | 1.6 | 1.4 | 1.4 | 1.4 | 1.3 | 1.3 |
| TL | 69.1% | 71.4% | 72.9% | 71.8% | 72.5% | 70.5% |
| HUD image quality | Clear and no ghosting | Clear and no ghosting | Clear and no ghosting | Clear and no ghosting | Clear and no ghosting | Clear and no ghosting |

As can be seen from table 2, the transparent nano film is provided in embodiments 6 to 10 and comparative embodiment 2, thus the HUD function can be realized, and the HUD image is clear and has no ghosting and has a good display effect. Compared with comparative embodiment 2, the outer glass panel with a refractive index n ranging from 1.35 to 1.49 and/or the inner glass panel with a refractive index n ranging from 1.35 to 1.49 are selected, it is possible to improve the reflectivity for P-polarized light of the laminated glass and reduce the reflectivity for visible light of the fourth surface 232 while ensuring the transmittance for visible light of the laminated glass to be greater than or equal to 70%, so that Rmax/Rmin ranges from 1.3 to 1.4 in embodiment 6 to 10 where the transparent nano film is provided, the HUD image can be displayed as neutral as possible, the requirements of a relatively large FOV can be met, and the uniformity of the overall brightness of the HUD image can be achieved. Moreover, a total thickness of three silver layers in embodiment 10 is greater than 30 nm, and the transmittance TL for visible light in embodiment 10 is still greater than 70%, which meets the requirements of the standard GB9656, and also significantly improves Rp(60°).

Embodiments 11 to 15 and Comparative Embodiment 3

In the disclosure, embodiments 11 to 15 and comparative embodiment 3 are carried out by designing a film structure of the transparent nano film and adjusting a value of T1/T2 of the P-polarized light incident on the fourth surface.

Laminated glass: outer glass panel (2.1 mm clear glass, n=1.52)/transparent nano film/PVB (0.76 mm)/inner glass panel (0.7 mm clear glass, n=1.47).

Transparent nano film: outer glass panel/ZnSnOx (37.3 nm)/AZO (10 nm)/Ag (6.7 nm)/AZO (10 nm)/ZnSnOx (51.3 nm)/AZO (10 nm)/Ag (6.8 nm)/AZO (10 nm)/ZnSnOx (45 nm)/AZO (10 nm)/Ag (14.4 nm)/AZO (10 nm)/ZnSnOx (24 nm)/SiN (5 nm).

Rmax/Rmin=1.4 is obtained by measurement and calculation.

Embodiment 11: T1/T2 of the P-polarized light incident is equal to 0.8.

Embodiment 12: T1/T2 of the P-polarized light incident is equal to 0.7.

Embodiment 13: T1/T2 of the P-polarized light incident is equal to 0.6.

Embodiment 14: T1/T2 of the P-polarized light incident is equal to 0.5.

Embodiment 15: T1/T2 of the P-polarized light incident is equal to 0.4.

Comparative embodiment 3: the P-polarized light incident is white light generated by the projection light source without light filtering or color filtering processing.

In embodiments 11 to 15 and comparative embodiment 3, the HUD system projects the P-polarized light generated by the projection light source at an incidence angle of 50°, 55°, 60°, 65°, and 70°. A target image rendered is observed from a direction of a reflection angle of corresponding to the incidence angle. Whether the HUD image is reddish or yellowish is determined according to a standard that the target image is a white facula, and an RGB value of the white facula is (255, 255, 255). Observation results are taken in table 3.

TABLE 3

HUD image quality in embodiments 11 to 15 and comparative embodiment 3

| Incidence angle | R1/R2 | Comparative embodiment 3 | Embodiment 11 | Embodiment 12 | Embodiment 13 | Embodiment 14 | Embodiment 15 |
|---|---|---|---|---|---|---|---|
| 50° | 1.16 | slightly yellowish | white | white | white | white | white |
| 55° | 1.23 | slightly yellowish | white | white | white | white | white |
| 60° | 1.33 | slightly reddish-yellowish | white | white | white | white | white |
| 65° | 1.28 | slightly yellowish | white | white | white | white | white |
| 70° | 1.24 | slightly yellowish | white | white | white | white | white |

As can be seen from table 3, R1/R2 of the laminated glass provided with the transparent nano film ranges from 1.16 to 1.33. In comparative embodiment 3, the target image is rendered in slightly yellowish or slightly reddish-yellowish when the white light generated by the projection light source without light filtering or color filtering processing is incident at 50°, 55°, 60°, 65°, and 70°, and there is no significant effect on visual observation. However, in embodiments 11 to 15, the target image is rendered as the standard white facula without being slightly yellowish or slightly reddish-yellowish by using P-polarized light incident with T1/T2 ranging from 0.4 to 0.8, so that HUD images of a relatively high quality can be obtained.

The HUD system provided in the disclosure is elaborated above. However, the disclosure is not limited by the embodiments illustrated above. Therefore, any improvements, equivalent modification, and arrangements made according to the technical points are within the scope of protection of the disclosure.

What is claimed is:

1. A head-up display (HUD) system, comprising a projection light source, and laminated glass, and a transparent nano film, wherein the laminated glass comprises an outer glass panel, an inner glass panel, and an intermediate adhesive layer sandwiched between the outer glass panel and the inner glass panel, wherein the outer glass panel has a first surface and a second surface, the inner glass panel has a third surface and a fourth surface, the transparent nano film is disposed between the second surface and the third surface and comprises at least two metal layers;

the projection light source is configured to generate P-polarized light incident on the fourth surface, wherein the P-polarized light has an incident angle ranging from 45° to 72°, and each of the at least two metal layers is made of metal or metal alloy that is capable of reflecting P-polarized light so that the transparent nano film is capable of reflecting at least part of the P-polarized light incident; and a distance between the transparent nano film and the fourth surface is less than or equal to 1.86 mm, the laminated glass provided with the transparent nano film has a reflectivity for the P-polarized light greater than or equal to 6%, and has a maximum reflectivity Rmax and a minimum reflectivity Rmin for the P-polarized light that has the incident angle ranging from 45° to 72°, wherein Rmax/Rmin ranges from 1.0 to 2.0;

wherein the maximum reflectivity Rmax is the maximum value of reflectivity of the laminated glass provided with the transparent nano film for P-polarized light at the incident angle ranging from 45° to 72°, and the minimum reflectivity Rmin is the minimum value of reflectivity of the laminated glass provided with the transparent nano film for P-polarized light at the incident angle ranging from 45° to 72°.

2. The HUD system according to claim 1, wherein the intermediate adhesive layer has a cross-section in a wedge-shape and having a wedge angle ranging from 0.01 milliradians (mrad) to 0.18 mrad.

3. The HUD system according to claim 1, wherein a proportion of the P-polarized light in polarized light generated by the projection light source is 100%.

4. The HUD system according to claim 1, wherein at least one metal layer has a thickness ranging from 4 nm to 8 nm.

5. The HUD system according to claim 1, wherein the transparent nano film comprises at least three metal layers, and a total thickness of the at least three metal layers is greater than 30 nm.

6. The HUD system according to claim 1, wherein at least one metal layer has a thickness greater than or equal to 12 nm.

7. The HUD system according to claim 1, wherein the transparent nano film is deposited on at least one surface of a thermoplastic polyester layer, wherein the thermoplastic polyester layer is disposed between the outer glass panel and the inner glass panel, and made from polyethylene terephthalate or polyethylene naphthalate.

8. The HUD system according to claim 1, wherein at least one of the outer glass panel or the intermediate adhesive layer is capable of absorbing the P-polarized light, so that the laminated glass provided with the transparent nano film has an absorptivity for the P-polarized light ranging from 8% to 30%.

9. The HUD system according to claim 1, wherein at least one of the outer glass panel or the inner glass panel is made from fluoride glass, silica glass, or borosilicate glass.

10. The HUD system according to claim 1, wherein the outer glass panel is a curved glass plate with a thickness greater than or equal to 1.8 mm, and the inner glass panel is a curved glass plate with a thickness less than or equal to 1.4 mm.

11. The HUD system according to claim 1, wherein the laminated glass provided with the transparent nano film has a reflectivity for the P-polarized light greater than or equal to 10%.

12. The HUD system according to claim 1, wherein the laminated glass provided with the transparent nano film has a reflectivity R1 for near-infrared light with a wavelength ranging from 580 nm to 680 nm and a reflectivity R2 for blue-green light with a wavelength ranging from 450 nm to 550 nm, and wherein R1/R2 ranges from 1.0 to 1.7.

13. The HUD system according to claim 1, wherein a proportion of near-infrared light with a wavelength ranging from 580 nm to 680 nm in the P-polarized light incident on the fourth surface is T1, a proportion of blue-green light with a wavelength ranging from 450 nm to 550 nm in the P-polarized light incident on the fourth surface is T2, wherein T1/T2 ranges from 0.1 to 0.9.

14. The HUD system according to claim 1, wherein
the laminated glass provided with the transparent nano film has a reflectivity R1 for near-infrared light with a wavelength ranging from 580 nm to 680 nm and a reflectivity R2 for blue-green light with a wavelength ranging from 450 nm to 550 nm, wherein R1/R2 ranges from 1.01 to 1.5; and
a proportion of near-infrared light with a wavelength ranging from 580 nm to 680 nm in the P-polarized light incident on the fourth surface is T1, a proportion of blue-green light with a wavelength ranging from 450 nm to 550 nm in the P-polarized light incident on the fourth surface is T2, and wherein T1/T2 ranges from 0.4 to 0.8.

15. The HUD system according to claim 1, wherein the HUD system further comprises a light-filtering component, wherein the light-filtering component is located on a light path of the P-polarized light and has a transmittance for the P-polarized light greater than or equal to 80%.

16. The HUD system according to claim 1, wherein the HUD system further comprises a projection control system configured to control the projection light source to generate the P-polarized light, wherein a color-filtering processing algorithm is in the projection control system and for processing the P-polarized light.

17. The HUD system according to claim 1, at least one of the outer glass panel or the inner glass panel has a refractive index ranging from 1.35 to 1.49.

18. The HUD system according to claim 1, the transparent nano film is deposited on the second surface or the third surface.

19. The HUD system according to claim 1, the transparent nano film includes an underlying metal layer, an intermediate metal layer, and an outermost metal layer, a thickness of the outermost metal layer is at least 1.5 times a thickness of the underlying metal layer or a thickness of the intermediate metal layer.

20. The HUD system according to claim 19, a difference between the thickness of the underlying metal layer and the thickness of the intermediate metal layer is less than or equal to 2 nm.

* * * * *